United States Patent
Roh

(10) Patent No.: US 11,119,186 B2
(45) Date of Patent: Sep. 14, 2021

(54) RADAR PROCESSING CHAIN FOR FREQUENCY-MODULATED CONTINUOUS WAVE RADAR SYSTEMS

(71) Applicant: TEXAS INSTRUMENTS INCORPORATED, Dallas, TX (US)

(72) Inventor: June Chul Roh, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 217 days.

(21) Appl. No.: 16/212,046

(22) Filed: Dec. 6, 2018

(65) Prior Publication Data
US 2019/0178985 A1 Jun. 13, 2019

Related U.S. Application Data

(60) Provisional application No. 62/596,000, filed on Dec. 7, 2017.

(51) Int. Cl.
*G01S 7/295* (2006.01)
*G01S 7/292* (2006.01)
(Continued)

(52) U.S. Cl.
CPC ............ *G01S 7/295* (2013.01); *G01S 7/2923* (2013.01); *G01S 7/354* (2013.01); *G01S 13/42* (2013.01);
(Continued)

(58) Field of Classification Search
CPC ........ G01S 13/42; G01S 13/536; G01S 13/56; G01S 2007/356; G01S 7/2923; G01S 7/295; G01S 7/354
See application file for complete search history.

(56) References Cited

U.S. PATENT DOCUMENTS

2010/0271258 A1* 10/2010 Takabayashi ......... G01S 13/345
342/107
2012/0119938 A1 5/2012 Abe et al.
(Continued)

FOREIGN PATENT DOCUMENTS

CN 103245943 A 8/2013
EP 27443727 A2 6/2014

OTHER PUBLICATIONS

Hu, X., et al. "Motion Compensation for TDM MIMO Radar by Sparse Reconstruction," Electronic Letters, vol. 53, Issue 24, http://digital-library.theiet.org/content/journals/el/53/24, Nov. 23, 2017, pp. 1604-1606.
(Continued)

*Primary Examiner* — Timothy X Pham
(74) *Attorney, Agent, or Firm* — Brian D. Graham; Charles A. Brill; Frank D. Cimino

(57) ABSTRACT

Systems and methods are provided for a radar processing chain for frequency-modulated continuous wave radar systems. A transmitter transmits a plurality of chirps, each comprising an electromagnetic radiation signal, at a region of interest. A receiver front-end receives reflected electromagnetic radiation for each chirp and generates a time series of beat-signal samples for each chirp at each antenna of a plurality of antennas. A signal processor detects objects within the region of interest by providing a frequency domain representation of each time series of beat-signal samples as sample values for a set of range bins representing respective distances from the receiver, correcting the sample values for each of the set of range bins to provide a set of clutter corrected samples for each range bin, and determining an angular spectrum for each of a subset of the set of range bins from the clutter corrected samples.

18 Claims, 4 Drawing Sheets

(51) Int. Cl.
    *G01S 13/536*     (2006.01)
    *G01S 13/56*     (2006.01)
    *G01S 13/42*     (2006.01)
    *G01S 7/35*     (2006.01)

(52) U.S. Cl.
    CPC ............ *G01S 13/536* (2013.01); *G01S 13/56* (2013.01); *G01S 7/356* (2021.05)

(56) References Cited

U.S. PATENT DOCUMENTS

| | | | |
|---|---|---|---|
| 2014/0184437 A1* | 7/2014 | Takabayashi | G01S 13/584 342/107 |
| 2015/0323649 A1 | 11/2015 | Lee et al. | |
| 2015/0378016 A1* | 12/2015 | Schoor | G01S 13/931 342/21 |
| 2016/0041260 A1* | 2/2016 | Cao | G01S 13/522 342/129 |
| 2018/0341006 A1* | 11/2018 | Kirita | G01S 7/411 |
| 2018/0364346 A1* | 12/2018 | Sicot | G01S 7/2813 |

OTHER PUBLICATIONS

Rahman, S., "FMCW Radar Signal Processing for Antarctic Ice Shelf Profiling and Imaging," Thesis, University College London, Apr. 29, 2016, 3 pages.
International Search Report and Written Opinion dated Mar. 28, 2019, International Application No. PCT/US2018/064578, 7 pages.
Kronauge, et al. "Fast Two-Dimensional CFAR Procedure" IEEE Transactions on Aerospace and Electronic Systems vol. 49, No. 3, Jul. 2013 pp. 1817-1823.
Rohling "Radar CFAR Thresholding in Clutter and Multiple Target Situations" IEEE Transactions on Aerospace and Electronic Systems vol. AES-19, No. 4, Jul. 1983 pp. 608-621.
European Search Report for 18886109.0 dated Dec. 15, 2020.

\* cited by examiner

RADAR PROCESSING CHAIN FOR FREQUENCY-MODULATED CONTINUOUS WAVE RADAR SYSTEMS

RELATED APPLICATIONS

This application claims priority from U.S. Provisional Application No. 62/596,000, filed 17 Dec. 2017, and entitled "RADAR PROCESSING CHAIN FOR FREQUENCY-MODULATED CONTINUOUS WAVE (FMCW) RADAR SYSTEMS.", which is hereby incorporated by reference in its entirety.

TECHNICAL FIELD

This disclosure relates to electrical systems, and more particularly, to a radar processing chain for frequency-modulated continuous wave (FMCW) radar systems.

BACKGROUND

One form of distance measuring radar is based on frequency modulation, in which a frequency of a returned signal is compared to that of the transmitted signal. This technique can be used in continuous wave radar and is used, for example, in vehicle applications such as adaptive cruise control (ACC), emergency braking, pedestrian detection, and 360-degree sensing, as well as industrial applications such as building automation, people counting, and surveillance. In these systems a carrier signal is frequency modulated in a predetermined way to provide a chirp and transmitted to a region of interest. A received reflection from the region of interest can be continuously compared to the transmitted chirp using a beat frequency modulator that produces a frequency tone representing a time delay between transmission of the chirp and reception of the reflection. This can be determined from the known frequency modulation of the chirp. A distance that the reflected signal travelled, which is twice the distance of the object from which the signal had reflected from the radar system, can be determined from this time delay.

SUMMARY

In accordance with an aspect of the present disclosure, a radar processing chain for frequency-modulated continuous wave radar systems is provided. A transmitter transmits a plurality of chirps, each comprising an electromagnetic radiation signal, at a region of interest and generates a time series of beat-signal samples for each chirp at each antenna of a plurality of antennas. A receiver front-end receives reflected electromagnetic radiation for each chirp. A signal processor detects any objects within the region of interest by providing a frequency domain representation of each time series of beat-signal samples as sample values for a set of range bins representing respective distances from the receiver, correcting the sample values for each of the set of range bins to provide a set of clutter corrected samples for each range bin, and determining an angular spectrum for each of a subset of the set of range bins from the clutter corrected samples.

In accordance with another aspect of the present disclosure, a method is provided. A plurality of chirps, each comprising a frequency-modulated continuous wave electromagnetic radiation signal, are transmitted at a region of interest. Electromagnetic radiation reflected from the region of interest after each chirp is received at a receiver front-end. The received electromagnetic radiation for each chirp is mixed with the transmitted chirp to provide a beat signal. The beat signal is sampled to provide a time series of beat-signal samples for each chirp of the plurality of chirps at each antenna of a plurality of antennas. A frequency domain representation of each time series of beat-signal samples is generated to provide a sample value for each of a set of range bins, each representing an associated distance from the receiver front-end, for each chirp at each antenna. The frequency domain representation of the set of range bins is corrected to provide a set of clutter corrected samples, including a sample for each range bin and each chirp at each antenna. An angular spectrum is determined for a subset of the set of range bins from the clutter corrected samples. Any objects within the region of interest are detected from the determined angular spectrum across the set of range bins.

In accordance with yet another aspect of the present disclosure, a method is provided for processing radar returns to detect objects within a region of interest. A time series of beat-signal samples is generated for each chirp of a plurality of chirps at each antenna of a plurality of antennas. A frequency domain representation of each time series of beat-signal samples is generated to provide a sample value for each of a set of range bins, each representing an associated distance from a radar sensor, for each chirp at each antenna. The frequency domain representation of the set of range bins is corrected to provide a set of clutter corrected samples, including a sample for each range bin and each chirp at each antenna. An angular spectrum for a subset of the set of range bins is determined from the clutter corrected samples. A location of at least one object within the region of interest is determined from the determined angular spectrum across the set of range bins. Spatial beamforming is applied to a dimensional spatial vector comprising all clutter corrected samples for a given range bin of the set of range bins and a given chirp of the plurality of chirps across the plurality of antennas to provide, for the given range bin and chirp, a beamformed signal block for the range bin. The given range bin is selected from a set of at least one range bins associated with the at least one object. A Fast Fourier transform (FFT) is applied to the beamformed signal block for the range bin to provide a Doppler spectral vector. Doppler information is extracted or an object of the at least one object associated with the given range bin from the Doppler spectral vector.

DETAILED DESCRIPTION

A radar processing chain has severe limitations in clutter-rich environments, such as determining the number and location of human beings in a region of interest. The systems and methods described herein provide a radar signal processing chain that includes clutter removal algorithm and allows high-resolution directional-of-arrival (DoA) estimation and low-complexity Doppler estimation for frequency-modulated continuous wave radar systems.

Figure 1:
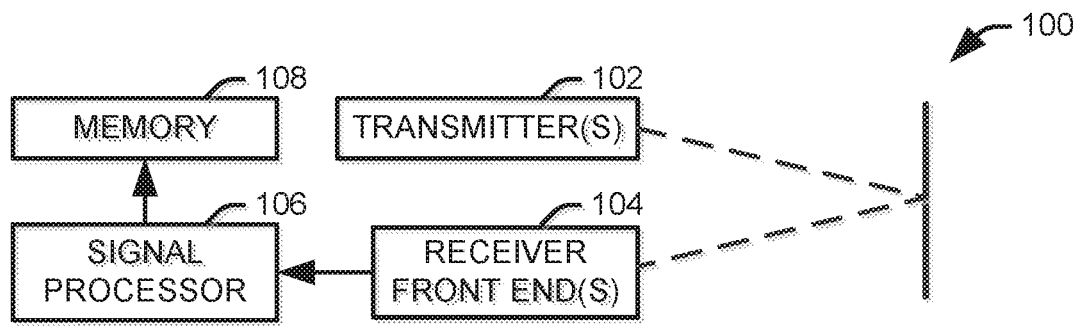
FIG. 1 illustrates a frequency-modulated continuous wave (FMCW) radar system.

FIG. 1 illustrates a frequency-modulated continuous wave (FMCW) radar system 100. The system 100 includes a transmitter 102 that transmits a FMCW electromagnetic radiation (EM) signal at a region of interest. It will be appreciated that the transmitter can include one or multiple antennas. In one implementation, the frequency-modulated continuous wave EM signal is a "chirp" signal having a frequency that increases with linearly with time, although it will be appreciated that the system 100 can utilize any appropriate signal in which the frequency varies with time in a known fashion. The transmitter 102 can provide the chirp signals in sets, referred to as frames. In one example, each frame contains sixty-four chirps, and the transmitter 102 transmits twenty frames per second. One or more receiver front-end(s) 104 receives electromagnetic radiation reflected from the region of interest for each chirp at each of a plurality of antennas, mixes the received electromagnetic radiation with the transmitted electromagnetic signal, samples a resulting beat signal to provide a time series of beat-signal samples for each of a plurality of antennas, and provides the time series of beat-signal samples to a signal processor 106. In one implementation, the plurality of antennas are virtual antennas, with outputs extracted via digital signal processing from the outputs of an array of physical transmit and receive antennas. In such a case, a time series of beat-signal samples is generated for each of the virtual antennas. An example of a radar system using a time division multiplexed multiple input and multiple output (TDM-MIMO) implementation of a virtual antenna array can be found in TI Application Report SWRA554A, (see http://www.ti.com/lit/an/swra554a/swra554a.pdf), which is hereby incorporated by reference.

The one or more receiver front-end(s) provides time series of beat-signal samples for each of the plurality of antennas. Specifically, the transmitted FMCW signal is compared to the return signal to determine a difference in frequency between the transmitted and returned signals. For example, the signals can be subjected to heterodyne mixing to produce a beat frequency from the two signals. Since the frequency modulation pattern is known, the change in frequency between the signals at a given time can provide the time of flight for the signal, and thus the range information from which the returned signal was reflected.

The signal processor 106 evaluates the time series of beat-signal samples to detect objects within the region of interest. It will be appreciated that the signal processor can be implemented, for example, as a dedicated microprocessor. The signal processor 106 provides a frequency domain representation of each time series of beat-signal samples as values for a set of range bins representing distance from the radar sensor module, as a discretized representation of the return strength over range. Accordingly, for each chirp signal, a set of range bin values can be determined for each of the plurality of antennas via a Fast Fourier Transform (FFT). In one implementation, the set of range bin values is determined by averaging a set of signal samples from the beat signal for the chirp to provide a DC component and subtracting the DC component from each sample to provide a set of DC-compensated samples. The DC-compensated samples are then subjected to a Fast Fourier Transform to provide the set of range bin values. In some applications, the DC-compensation can be preceded by a windowing operation, instead of using all samples received after a given chirp.

The signal processor 106 then corrects the frequency domain representation of the set of range bin values to provide a clutter corrected signal. The clutter correction can be applied, for example, by determining a direct current (DC) component as an average (e.g., mean) range bin value across chirps in a frame for a given range bin and antenna, and subtracting the determined DC component from each range bin value associated with the given range bin and received at the given antenna. Accordingly, after a frame of chirps has been evaluated, the resulting data can be conceptualized as a three-dimensional data structure, in which each sample value in the clutter corrected signal represent a given chirp, range bin, and virtual antenna.

The signal processor 106 also determines an angular spectrum for each range bin using the sample values in the clutter corrected signal. In practice, the angular spectrum can be determined via application of a covariance-based direction-of-arrival determination algorithm, such as a minimum variance distortion-less response (MVDR) algorithm, a multiple signal classification (MUSIC) algorithm, or an Estimation of Signal Parameters by Rotational Invariance Techniques (ESPIRIT) algorithm. The signal processor 106 can then review the generated angular spectra to across the set of range bins to determine if an object is present. In one implementation, the determined angular spectrum is represented as a range-azimuth spectrum matrix representing a strength of a returned signal as a two-dimensional mapping of range and azimuth, referred to as a "range-azimuth profile" relative to the radar sensor module. This matrix can be searched for peak values, for example, via a constant false alarm rate (CFAR) algorithm. The locations of any detected objects can then be stored in a non-transitory memory 108 for later use, for example, by an automated system associated with the frequency-modulated continuous wave radar system 100.

Figure 2:
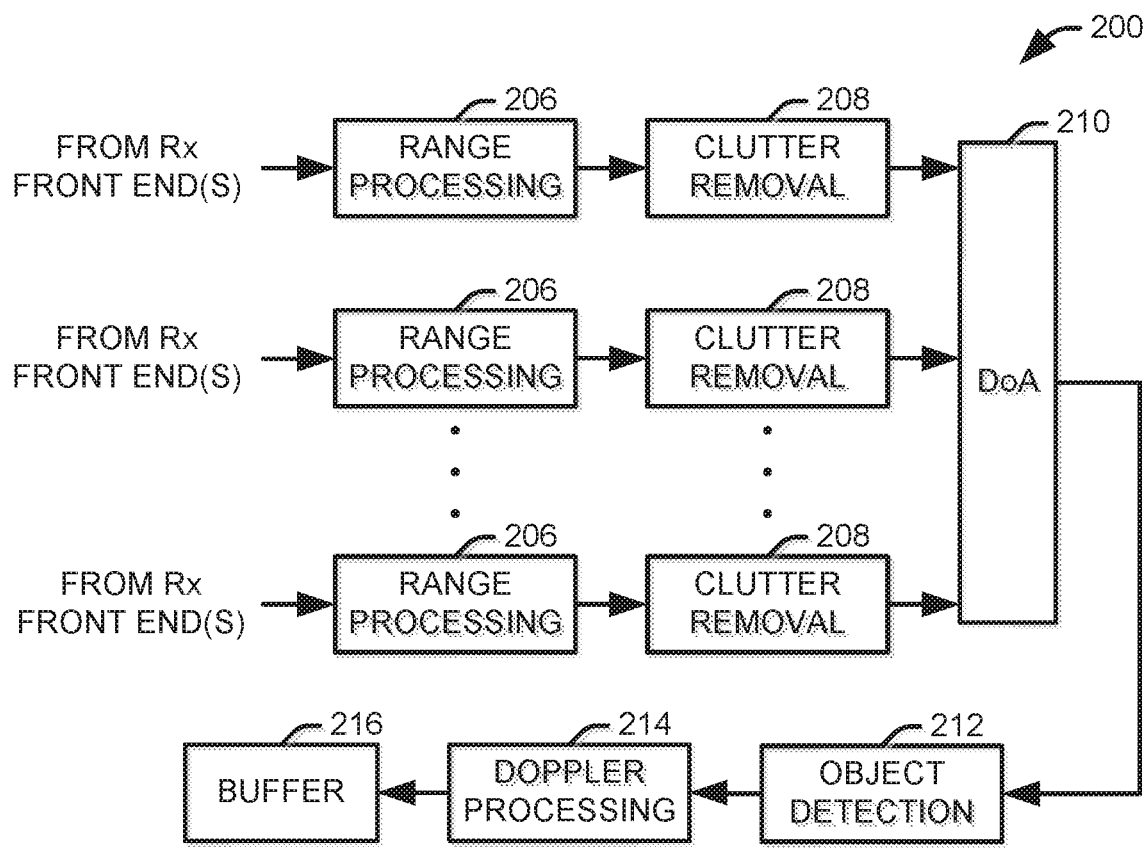
FIG. 2 illustrates one example of a signal processing component for processing frequency-modulated continuous wave (FMCW) radar signals.

FIG. 2 illustrates one example of a signal processing component 200 for processing frequency-modulated radar signals. For example, the signal processing component 200 can be used to provide the function of the signal processor 106 of FIG. 1. In the illustrated example, the signal processing component 200 receives samples, representing one of a physical or virtual antenna, from one or more receiver front ends. In the illustrated example 200, it is assumed that an array of virtual antennas are derived from a set of physical transmit and receive antennas, but it will be appreciated that the plurality of antennas could all be physical receive antennas representing a beat signal between the transmitted chirp and the received signal from each chirp that is generated at a mixer and sampled at an analog-to-digital converter (ADC) during the chirping time. The samples from each receiver front end are processed in a respective range processing block 206.

Each range processing block 206 performs a Fast Fourier Transform (FFT) to provide, for an associated antenna, a set of values representing a strength of the reflected signal from each of a plurality of discrete ranges from the antenna. In one implementation, a windowing function can be applied to the input samples for the FFT prior to generating the FFT. A direct current (DC) component in the input signal samples can be estimated by averaging the samples in each chirp, and subtracted from each sample in the chirp. If the windowing function is used, any estimation and compensation for DC is applied after the windowing operation. In the illustrated implementation, the FFT for each chirp for each antenna is stored in a buffer as a set of range bin values. Given that there are multiple, $N_c$, chirps in each frame, a number, $N_a$, of virtual antennas, and a defined number of range bins, $N_r$, this provides a three-dimensional data structure with $N_r \times N_c \times N_a$ entries.

In clutter-rich environments, especially indoor environments, detecting objects with small radar cross section (RCS), such as human beings and other lifeforms can be challenging. In many cases, sources of clutter with a large RCS, such as building structures and furniture, can dominate the received signal. As a result, objects with small RCS can be buried under the strong interference from these clutter sources and become difficult to detect. When the radar sensor is stationary, clutter sources and all stationary objects do not exhibit a Doppler component, and this can be exploited by a clutter removal component 208 to improve the signal condition for the remaining radar signal processing chain.

In one implementation, each clutter removal component 208 can estimate a DC component for each range bin across chirps within a frame. A DC component estimate is obtained by averaging the range FFT output samples across the chirp, such that:

$$\bar{x}_{n,p} = \frac{1}{N_c} \sum_{k=1}^{N_c} x_{n,k,p} \qquad \text{Eq. 1}$$

where the range FFT output samples are denoted as $\{x_{n,k,p}\}$, where $x_{n,k,p}$ represents the signal for the $n^{th}$ range bin in the $k^{th}$ chirp at the $p^{th}$ antenna, wherein n is an integer between one and $N_r$, the number of range bins, k is an integer between one and $N_c$, the number of chirps in a frame, and p is an integer between one and $N_a$, the number of antennas of the system.

The estimated DC component, $\bar{x}_{n,p}$, is then subtracted from each range FFT output sample, $x_{n,k,p}$, such that $x_{n,k,p} \leftarrow (x_{n,k,p} - \bar{x}_{n,p})$. This is repeated for each range bin and for each antenna. The range processing and the clutter removal operation are applied to each antenna, and the resulting samples are stored as a set of clutter-corrected samples. The clutter-corrected samples can be conceptualized as a three-dimensional data structure (of size $N_r \times N_c \times N_a$) indexed with the range index, n, the chirp index, k, and the antenna index, p.

The clutter-corrected samples from each antenna are provided to a direction-of-arrival (DoA) component 210 determines a DoA angular spectrum for each range bin using the clutter-corrected samples. Collectively, the angular spectra form a range-azimuth spectrum. Specifically, the DoA component 210 performs a high-resolution direction-of-arrival spectral estimation based on spatial covariance estimated within a radar frame. In the illustrated example, a minimum variance distortion-less response (MVDR) based direction-to-arrival (DoA) estimation approach is described. It will be appreciated, however, that other covariance-based high-resolution DoA methods (e.g., MUSIC or ESPRIT) can be used as well using the same radar processing signal chain.

The DoA component 210 first estimates a spatial covariance for each range bin, $\hat{R}_n$, as:

$$\hat{R}_n = \frac{1}{N_c} \sum_{k=1}^{K} x_{n,k} x_{n,k}^H \qquad \text{Eq. 2}$$

where $x_{n,k}$ is a $N_a$ dimensional spatial vector for $n^{th}$ range bin and the $k^{th}$ chirp, which is formed by stacking samples across the virtual antennas, such that $x_{n,k} = [x_{n,k,1}, x_{n,k,2}, \ldots, x_{n,k,N_a}]^T$. $x^H$ represents the Hermition transpose of vector x. In order to reduce the amount of computation, a number, K, of chirps less or equal to the available number of chirps in the frame, $N_c$, is used in estimating the spatial covariance.

In the MVDR approach, also known as Capons' beamforming, of the illustrated implementation, a steering vector, $a(\theta)$, for an azimuth angle $\theta$ is determined for a linear one-dimensional virtual receiver antenna array as:

$$a(\theta) = [1, e^{-j2\pi \sin \theta}, e^{-j4\pi \sin \theta}, \ldots, e^{-j2\pi(N_a-1)d \sin \theta}]^T \qquad \text{Eq. 3}$$

where d is the inter-antenna spacing normalized by the wavelength.

The steering vector contains expected phase values across the virtual antenna array for each hypothesis DoA angle, and represents a phase difference for each of the virtual receive antennas when the incident radar radio-frequency (RF) signal comes from azimuth angle $\theta$. The angular spectrum for the $n^{th}$ range bin is given by:

$$P_n(\theta) = \frac{1}{a(\theta)^H \hat{R}_n^{-1} a(\theta)} \qquad \text{Eq. 4}$$

The corresponding beamforming vector is given as:

$$w_n(\theta) = \frac{\hat{R}_n^{-1} a(\theta)}{a(\theta)^H \hat{R}_n^{-1} a(\theta)} \qquad \text{Eq. 5}$$

The DoA spectrum for each range bin is stacked into a matrix form, where the $n^{th}$ row is populated with the DoA spectrum of the $n^{th}$ range bin, $P_n(\theta)$. This matrix is referred to here as the range-azimuth spectrum matrix, and it represents the strength of electromagnetic radiation reflected from the region of interest at a set of distances and angles relative to the radar sensor.

In some situations, the spatial covariance estimate for a given range bin is singular or near-singular, which may cause numeric stability issues in doing the matrix operation (for example, matrix inversion) as a part of the DoA spectral estimation. One way to avoid the numeric stability issues is adding a small value, referred to as the diagonal loading factor, $\alpha_n$, along the diagonal of the covariance estimate matrix, such that:

$$P_n(\theta) = \frac{1}{a(\theta)^H [R_n + a_n I]^{-1} a(\theta)} \qquad \text{Eq. 6}$$

The diagonal loading factor $\alpha_n$ may be determined using the noise variance estimate, $\hat{\sigma}_n^2$, and a constant, $\beta$, as $\beta \hat{\sigma}_n^2$, and the product of the diagonal loading factor and the identity matrix is referred to herein as a diagonal loading matrix. Specifically, in environments in which the variation over time is slow compared with the time scale of chirping in a radar frame, it can be assumed that the signal component of the clutter-corrected output does not change much between two adjacent chirps, while the noise component changes independently. This can be exploited to estimate the noise power or variance that is embedded in the radar signal, for a given range bin, n, and virtual receive antenna, p, as:

$$\hat{\sigma}_{n,p}^2 = \frac{1}{2(N_c - 1)} \sum_{k=1}^{N_c-1} |x_{n,k+1,p} - x_{n,k,p}|^2 \qquad \text{Eq. 7}$$

where $x_{n,k,p}$ are the clutter-corrected samples provided to the DoA component 210.

A noise variance estimate for a range bin, n, can be determined by calculating a mean noise variance across the virtual antennas, such that:

$$\sigma_n^2 = \frac{1}{N_a} \sum_{p=1}^{N_a} \hat{\sigma}_{n,p}^2 \qquad \text{Eq. 8}$$

The computation cost for DoA spectral estimation can be reduced by running DoA estimation only on range bins that have high probability of having one or more objects. To determine good candidates for DoA spectral estimation, a one-dimensional constant false alarm rate (CFAR) algorithm can be used. In one implementation, an input for the CFAR algorithm is prepared by averaging the clutter-corrected sample values over all the chirps within a frame and all the virtual receive antennas such that a nth element, $s_n$, of a range profile vector, $s=[s_1, s_2, \ldots, s_{N_r}]$, is determined as:

$$s_n = \frac{1}{N_c N_a} \sum_{p=1}^{N_a} \sum_{k=1}^{N_c} |x_{n,k,p}|^2 \qquad \text{Eq. 9}$$

Once the range profile vector is determined, a one-dimensional CFAR algorithm can be performed on the range profile vector s to determine which range bins are likely to contain objects, referred to herein as "detected range bins". In a CFAR algorithm, values in the range profile vector that are peaks, that is, rise above the surrounding elements in the array (e.g., vector or matrix) as well as a background level, can be selected as detected range bins. The DoA spectral estimation described previously can be performed only on the detected range bins.

The range-azimuth spectrum matrix determined at the DoA component 210 is provided to an object detection component 212 that locates any objects within the region of interest. In one implementation, the object detection component 212 applies a two-dimensional CFAR algorithm to the range-azimuth spectrum matrix. Information associated with the detected objects is stored, for example, as a range index, $n_i$, within the matrix, an angular index, $m_i$, within the matrix, a power level, and a noise power level estimation, where i is an index representing an $i^{th}$ detected object.

Once a set of objects have been located, their location within the range-azimuth spectrum matrix are provided to a Doppler processing element 214. The Doppler processing element 214 applies spatial beamforming to the multiple streams of data from the virtual antennas and performs a Doppler FFT on the resulting beamformed data stream. In one implementation, for an $i^{th}$ detected object, spatial beamforming is applied to each spatial vector, $x_{n_i,k}$ in each chirp for range bin $n_i$ to provide a single steam of beamformed signal block, $y_i=[y_{i,k}:k=1, \ldots, N_c]$ as follows:

$$y_{i,k} = (w_{n_i}(\theta_{m_i}))^H x_{n_i,k} \qquad \text{Eq. 10}$$

where $$w_n(\theta) = \frac{R_n^{-1} a(\theta)}{a(\theta)^H [R_{n_i} + \alpha_{n_i} I]^{-1} a(\theta)},$$

and the superscript H indicates the Hermitian transpose of a vector.

It will be appreciated from Eq. 5 that the beamforming weight vector $w_{n_i}(\theta_{m_i})$ is dependent on the spatial covariance estimate for the particular range bin. In one example, a windowing operation can be applied to the resulting signal block $y_i$. An FFT operation is applied to the resulting beamformed signal block $y_i$ to provide a Doppler spectral vector $Y_i$. From the Doppler spectral vector $Y_i$, the Doppler information of the $i^{th}$ detected object can be extracted. All the information of the detected objects, which may include range information, Doppler information, DoA angular information, and power level and noise level, is then collected and saved into a buffer 216 as a form of 'point cloud radar data'.

Figure 3:
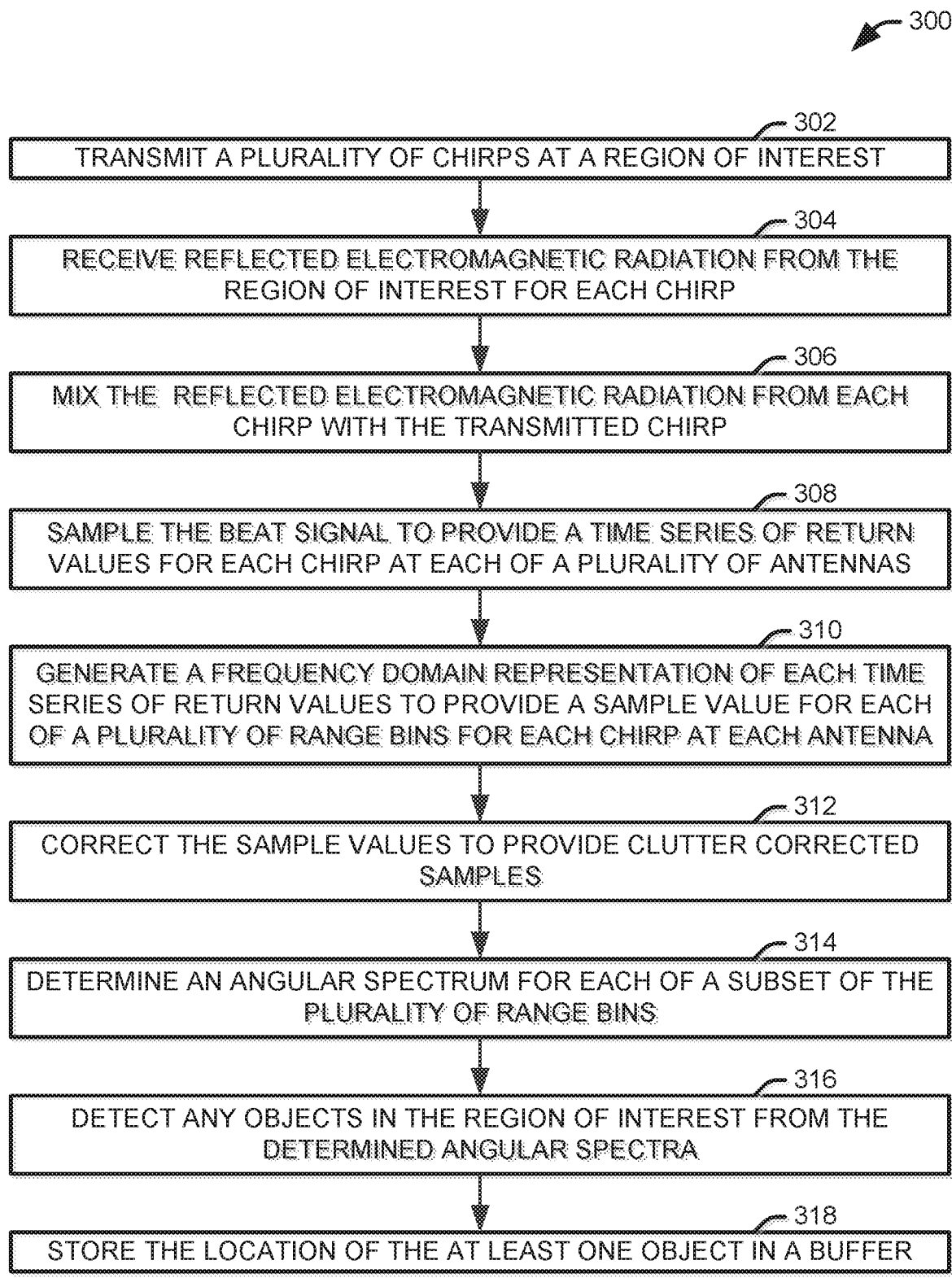
FIG. 3 illustrates one example of a method for monitoring a region of interest.
Figure 4:
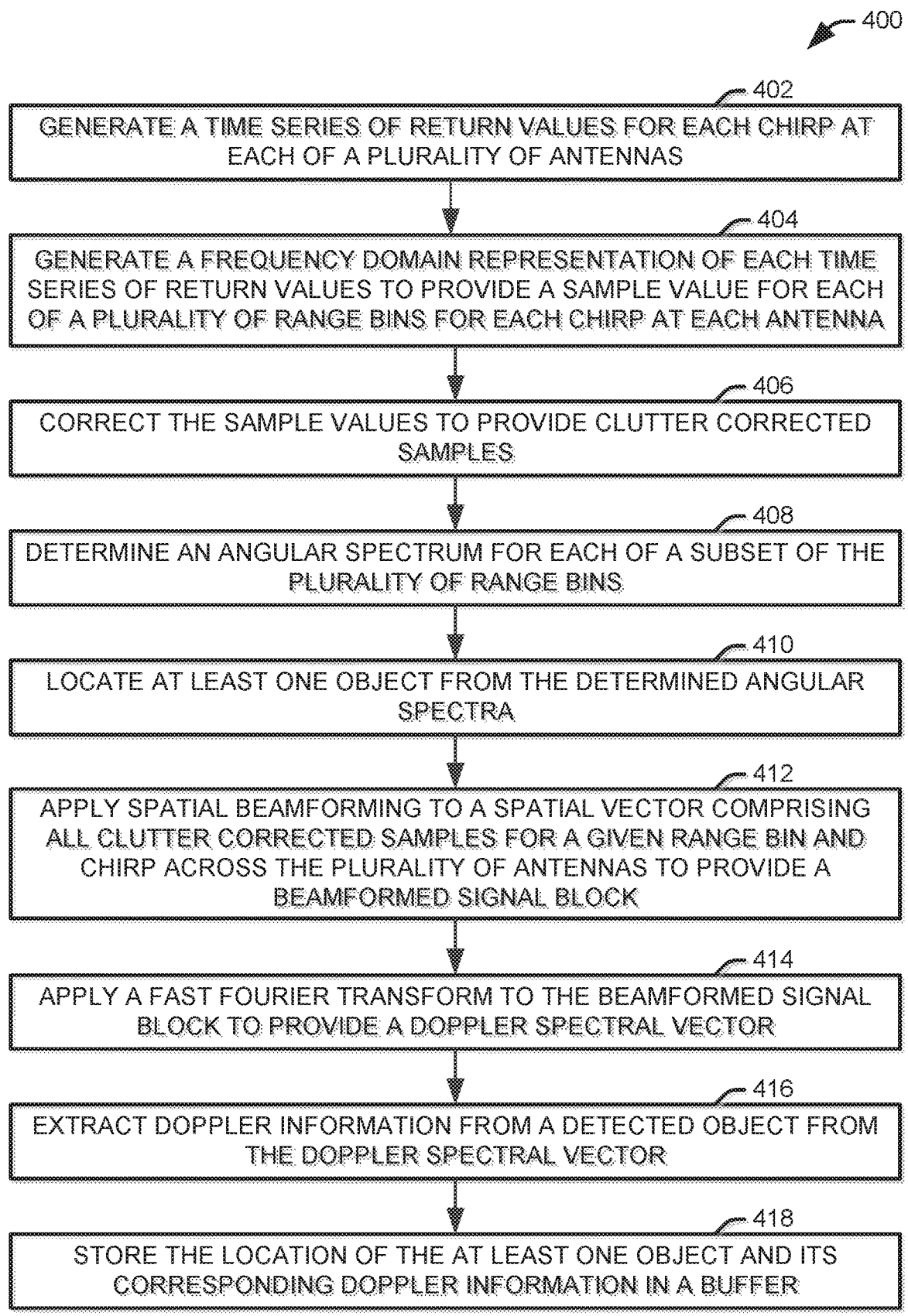
FIG. 4 illustrates one example of a method for processing received radar signals from a region of interest.

In view of the foregoing structural and functional features described above, example methods will be better appreciated with reference to FIGS. 3 and 4. While, for purposes of simplicity of explanation, the example methods of FIGS. 3 and 4 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 3 illustrates one example of a method 300 for monitoring a region of interest. At 302, a plurality of chirps, each comprising a frequency-modulated continuous wave (FMCW) electromagnetic radiation signal, are transmitted at a region of interest. At 304, electromagnetic radiation reflected from the region of interest after each chirp is received at receiver front-end. It will be appreciated that the chirps transmitted at 302 can be transmitted from one or multiple antennas and the reflected electromagnetic radiation can be received at a plurality of physical antennas. At 306, the received electromagnetic radiation for each chirp is mixed with the transmitted chirp to provide a beat signal, and at 308, the beat signal is sampled to provide a time series of beat-signal samples for each chirp of the plurality of chirps at each antenna of a plurality of antennas. In one implementation, each time series of beat-signal samples can be corrected for a DC component by averaging values from the time series of beat-signal samples for each chirp at each antenna to provide an estimated DC component of the values and subtracting the estimated DC component for that chirp and antenna pair from each of the time series of values for a given chirp at a given antenna.

At 310, a frequency domain representation of each time series of beat-signal samples is generated to provide a sample value for each of a set of range bins for each chirp at each antenna. Each range bin represents an associated distance from the receiver. In one example, the frequency domain representation is generated via a fast Fourier transform (FFT) on each of the time series of values. At 312, the frequency domain representation of the set of range bins is corrected to provide a set of clutter corrected samples, including a sample for each range bin and each chirp at each antenna. In one implementation, the set of clutter corrected samples can be generated by averaging samples across a subset of the plurality of chirps at each antenna to provide, for each range bin at each antenna, an estimated direct current (DC) component of the values, such that a DC component is generated for every possible pair of antenna and range bin. The estimated DC component for each range bin and antenna pair is then subtracted from each of the values in a given range bin for a given antenna.

At 314, an angular spectrum for a subset of the set of range bins is determined from the clutter corrected samples. For example, the angular spectrum for each range bin can be determined by applying a minimum variance distortion-less response (MVDR) algorithm to the clutter corrected samples. In one implementation, the subset of the set of range bins contains all of the range bins, such that the subset is coextensive with the set of range bins. In another implementation, the subset of range bins is selected by generating a range profile vector representing an aggregate signal strength for each of the set of range bins across the plurality of chirps and the plurality of antennas and determining, from the range profile vector, a set of range bins that are likely to contain objects as the subset of the set of range bins. For example, a one-dimensional constant false alarm rate algorithm can be applied to the range profile vector.

At 316, a location any objects within the region of interest is determined from the determined angular spectrum across the set of range bins. In one implementation, the angular spectra for the subset of the set of range bins can be represented as a range-azimuth spectrum matrix representing the strength of electromagnetic radiation reflected from the region of interest at a set of distances and angles relative to the radar sensor module. A location any objects within the region of interest can be determined by applying a two-dimensional constant false alarm rate algorithm to the range-azimuth spectrum matrix. The location and other available information about the detected objects, if any, can then be stored in a buffer at 318 for use by one or more other systems.

FIG. 4 illustrates one example of a method 400 for processing received radar signals within a region of interest. At 402, a time series of beat-signal samples is generated for each chirp of a plurality of chirps at each antenna of a plurality of antennas. In one implementation, the time series of beat-signal samples is generated by transmitting the plurality of chirps, each comprising a frequency-modulated electromagnetic radiation signal, at a region of interest and receiving electromagnetic radiation reflected from the region of interest after each chirp at a receiver front-end. The received electromagnetic radiation from each chirp is mixed with the transmitted chirp to provide a beat signal, and the beat signal is sampled to provide the time series of beat-signal samples for each chirp of the plurality of chirps at each antenna of the plurality of antennas.

At 404, a frequency domain representation of each time series of beat-signal samples is generated to provide a sample value for each of a set of range bins for each chirp at each antenna. Each range bin represents an associated distance from the receiver. In one example, the frequency domain representation is generated via a fast Fourier transform (FFT) on each of the time series of values. At 406, the frequency domain representation of the set of range bins is corrected to provide a set of clutter corrected samples, including a sample for each range bin and each chirp at each antenna. In one implementation, the set of clutter corrected samples can be generated by averaging samples for the set of range bins across a subset of the plurality of chirps at each antenna to provide, for each range bin at each antenna, an estimated direct current (DC) component of the values, such that a DC component is generated for every possible pair of antenna and range bin. The estimated DC component for each range bin and antenna pair is then subtracted from each of the values in a given range bin for a given antenna.

At 408, an angular spectrum for a subset of the set of range bins is determined from the clutter corrected samples. For example, the angular spectrum for each range bin can be determined by applying a covariance-based direction-of-arrival determination algorithm to the clutter corrected samples. In one implementation, the subset of the set of range bins contains all of the range bins, such that the subset is coextensive with the set of range bins. In another implementation, the subset of range bins is selected by generating a range profile vector representing an aggregate signal strength for each of the set of range bins across the plurality of chirps and the plurality of antennas and determining, from the range profile vector, a set of range bins that are likely to contain objects as the subset of the set of range bins. For example, a one-dimensional constant false alarm rate algorithm can be applied to the range profile vector.

At 410, a location of any objects within the region of interest from the determined angular spectrum across the set of range bins. At 412, spatial beamforming is applied to a $N_a$-length spatial vector comprising all clutter corrected samples for a given range bin of the set of range bins and a given chirp of the plurality of chirps across the plurality of antennas to provide, for the given range bin and chirp, a beamformed signal block for the range bin. It will be appreciated that the range bin can selected from a set of range bins associated with any detected objects. At 414, an FFT is applied to the beamformed signal block for the range bin to provide a Doppler spectral vector. At 416, Doppler information for the object associated with the range bin is extracted from the Doppler spectral vector. The location of any detected objects, the extracted Doppler information, and other available information about the detected objects can then be stored in a buffer at 418 for use by one or more other systems.

Figure 5:
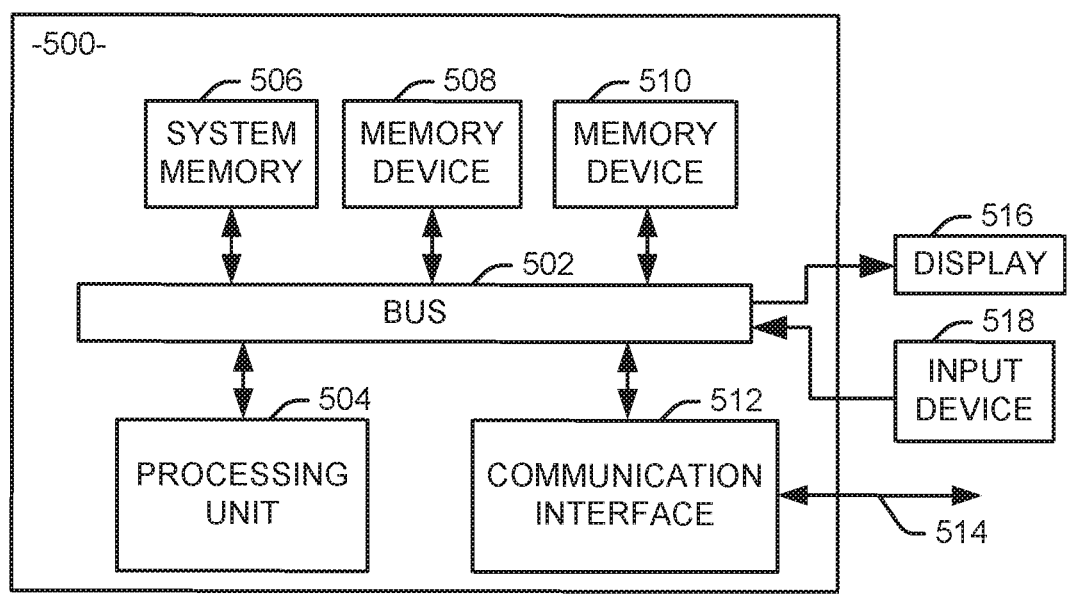
FIG. 5 is a schematic block diagram illustrating an exemplary system of hardware components capable of implementing examples of the systems and methods disclosed in FIGS. 1-4, such as the digital signal processor illustrated in FIG. 2.

FIG. 5 is a schematic block diagram illustrating an exemplary system 500 of hardware components capable of implementing examples of the systems and methods disclosed in FIGS. 1-4, such as the digital signal processor 200 illustrated in FIG. 2. The system 500 can include various systems and subsystems. The system 500 can be a personal computer, a laptop computer, a workstation, a computer system, an appliance, an application-specific integrated circuit (ASIC), a server, a server blade center, a server farm, etc. In one implementation, the system 500 is a microprocessor, and it will be appreciated that in this implementation, some of the components 502, 504, 506, 508, 510, 512, 514, 516, and 518 may not be necessary. In one example, the digital signal processor 200 can be implemented as an integrated circuit. Examples of integrated circuit hardware that could be adapted for this purpose can be found in TI datasheet SWRS203A, available at http://www.ti.com/general/docs/datasheetdiagram.tsp?genericPartNumber=AWR-1642&diagramId=SWRS203A, and TI datasheet SWRS2-02A, available at http://www.ti.com/general/docs/datasheet-diagram.tsp? genericPartNumber=AWR1443&diagramId= SWRS202A, each of which are hereby incorporated by reference.

The system 500 can includes a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, stand-alone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508 and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio, portions of which can be available in formats comprehensible to human beings. Additionally, or alternatively, the system 500 can access an external data source or query source through the communication interface 512, which can communicate with the system bus 502 and the communication link 514.

In operation, the system 500 can be used to implement one or more parts of a diagnostic and decision support system in accordance with the present disclosure. Computer executable logic for implementing the composite applications testing system resides on one or more of the system memory 506, and the memory devices 508, 510 in accordance with certain examples. The processing unit 504 executes one or more computer executable instructions originating from the system memory 506 and the memory devices 508 and 510. The term "computer readable medium" as used herein refers to any medium that participates in providing instructions to the processing unit 504 for execution, and it will be appreciated that a computer readable medium can include multiple computer readable media each operatively connected to the processing unit.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What have been described above are examples of the present disclosure. It is, of course, not possible to describe every conceivable combination of components or methodologies for purposes of describing the present disclosure, but one of ordinary skill in the art will recognize that many further combinations and permutations of the present disclosure are possible. Accordingly, the present disclosure is intended to embrace all such alterations, modifications, and variations that fall within the scope of the appended claims.

What is claimed is:

1. A system comprising:
   a transmitter configured to transmit a plurality of chirps, each comprising a frequency-modulated continuous wave electromagnetic radiation signal, at a region of interest;
   a receiver front-end configured to:
      receive electromagnetic radiation reflected from the region of interest for each chirp at each of a plurality of antennas, and
      generate a time series of beat-signal samples for each chirp at each antenna of the plurality of antennas; and
   a signal processor configured to:
      determine whether an object is within the region of interest by:
         providing a frequency domain representation of each time series of beat-signal samples as sample values for a set of range bins representing respective distances from the system;
         correcting the sample values for each of the set of range bins to provide a set of clutter corrected samples for each range bin by, for each range bin for each antenna of the plurality of antennas, computing an arithmetic mean of the sample values for the range bin across chirps in a frame of radar returns to provide an average value and subtracting the average value from each sample value for the respective range bin to provide the set of clutter corrected samples for the respective range bin; and
         determining an angular spectrum for each of a subset of the set of range bins from the clutter corrected samples.

2. The system of claim 1, wherein the plurality of antennas is a time division multiplexed multiple input and multiple output (TDM-MIMO) implementation of a virtual antenna array derived from a corresponding array of physical transmit and receive antennas.

3. The system of claim 1, wherein the signal processor is configured to:
   estimate a spatial covariance for the clutter corrected samples for each range bin across the plurality of antennas as a covariance estimate matrix;
   add a diagonal loading matrix, with each element along a diagonal of the diagonal loading matrix determined as a product of a noise variance estimate for the range bin and a selected constant, to the covariance estimate matrix; and
   calculate the angular spectrum using the sum of the covariance estimate matrix and the diagonal loading matrix, according to a covariance-based direction-of-arrival determination algorithm.

4. The system of claim 3, wherein the covariance-based direction-of-arrival determination algorithm is at least one of a minimum variance distortion-less response (MVDR) algorithm, a multiple signal classification (MUSIC) algorithm, or an Estimation of Signal Parameters by Rotational Invariance Techniques (ESPRIT) algorithm.

5. The system of claim 4, wherein the signal processor is configured to:
   generate a range profile vector representing an aggregate signal strength for each of the set of range bins across the plurality of chirps and the plurality of antennas; and determine, from the range profile vector, a set of range bins that are likely to contain objects as the subset of the set of range bins.

6. The system of claim 1, wherein, when an object is detected at the signal processor, the signal processor is configured to determine a location of at least one object within the region of interest from the determined angular spectra across the set of range bins.

7. The system of claim 6, wherein the signal processor is configured to:
apply spatial beamforming to a $N_a$ dimensional spatial vector comprising all clutter corrected samples for a given range bin of the set of range bins and a given chirp of the plurality of chirps across the plurality of antennas to provide, for the given range bin and chirp, a beamformed signal block for the range bin, wherein the given range bin is selected from a set of at least one range bin associated with the at least one object;
apply a Fast Fourier transform (FFT) to the beamformed signal block for the range bin to provide a Doppler spectral vector; and
extract Doppler information for an object of the at least one object associated with the given range bin from the Doppler spectral vector.

8. A method for detecting objects within a region of interest, comprising:
transmitting a plurality of chirps, each comprising a frequency-modulated continuous wave electromagnetic radiation signal, at a region of interest from a radar sensor module;
for each chirp of the plurality of chirps, receiving a reflection associated with the respective chirp at a plurality of receive antennas;
for each chirp of the plurality of chirps, mixing a signal representative of the respective reflection with a signal representative of the respective chirp to provide a beat signal;
sampling the beat signal to provide a time series of beat-signal samples for each chirp of the plurality of chirps for each antenna of the plurality of receive antennas;
providing a frequency domain representation of each time series of beat-signal samples to provide a sample value for each of a set of range bins, each representing an associated distance from the radar sensor module, for each chirp of the plurality of chirps at each antenna of the plurality of receive antennas;
correcting the frequency domain representation of the set of range bins to provide a set of clutter corrected samples, including a sample for each range bin and each chirp of the plurality of chirps at each antenna of the plurality of receive antennas, wherein the correcting includes:
averaging samples across a subset of the plurality of chirps at each antenna of the plurality of receive antennas to provide, for each range bin at each antenna of the plurality of receive antennas, a direct current (DC) component of the values, such that a respective DC component is generated for each combination of antenna and range bin; and
subtracting, from each of the values in a given range bin for a given antenna of the plurality of receive antennas, the respective DC component for the respective antenna and range bin combination;
determining an angular spectrum for a subset of the set of range bins from the clutter corrected samples; and
detecting whether an object is present based on the determined angular spectrum across the subset of the set of range bins.

9. The method of claim 8, further comprising applying spatial beamforming to a dimensional spatial vector comprising all clutter corrected samples for a given range bin of the set of range bins and a given chirp of the plurality of chirps across the plurality of antennas to provide, for the given range bin and chirp, a beamformed signal block for the range bin, wherein the given range bin is selected from a set of at least one range bins associated with the object.

10. The method of claim 9, further comprising:
applying a Fast Fourier transform (FFT) to the beamformed signal block for the range bin to provide a Doppler spectral vector; and
extracting Doppler information for a detected object associated with the given range bin from the Doppler spectral vector.

11. The method of claim 8, wherein determining the angular spectrum for the subset of the set of range bins from the clutter corrected samples provides a range-azimuth spectrum matrix representing the strength of electromagnetic radiation reflected from the region of interest at a set of distances and angles relative to the radar sensor module, and detecting whether an object is present within the region of interest from the determined angular spectra across the set of range bins comprises applying a two-dimensional constant false alarm rate algorithm to the range-azimuth spectrum matrix.

12. The method of claim 8, further comprising:
generating a range profile vector representing an aggregate signal strength for each of the set of range bins across the plurality of chirps and the plurality of receive antennas; and
determining, from the range profile vector, a set of range bins that are likely to contain objects as the subset of the set of range bins.

13. The method of claim 8, further comprising:
averaging values from the time series of beat-signal samples for each chirp at each antenna to provide an estimated direct current (DC) component of the values; and
subtracting, from each of the time series of values for a given chirp at a given antenna, the estimated DC component for that chirp and antenna pair.

14. A method for processing radar returns to detect objects within a region of interest, comprising:
generating a time series of beat-signal samples for each chirp of a plurality of chirps at each antenna of a plurality of antennas;
providing a frequency domain representation of each time series of beat-signal samples to provide a sample value for each of a set of range bins, each representing an associated distance from a radar sensor module, for each chirp at each antenna;
correcting the frequency domain representation of the set of range bins to provide a set of clutter corrected samples, including a sample for each range bin and each chirp at each antenna;
determining an angular spectrum for a subset of the set of range bins from the clutter corrected samples;
determining a location of at least one object within the region of interest from the determined angular spectrum across the set of range bins;
applying spatial beamforming to a dimensional spatial vector comprising all clutter corrected samples for a given range bin of the set of range bins and a given chirp of the plurality of chirps across the plurality of antennas to provide, for the given range bin and chirp, a beamformed signal block for the range bin, wherein the given range bin is selected from a set of at least one range bins associated with the at least one object;

applying a Fast Fourier transform (FFT) to the beamformed signal block for the range bin to provide a Doppler spectral vector; and extracting Doppler information for an object of the at least one object associated with the given range bin from the Doppler spectral vector.

15. The method of claim 14, further comprising:

generating a range profile vector representing an aggregate signal strength for each of the set of range bins across the plurality of chirps and the plurality of antennas; and applying a one-dimensional a constant false alarm rate algorithm to the range profile vector to determine a set of range bins that are likely to contain objects as the subset of the set of range bins.

16. The method of claim 14, wherein correcting the frequency domain representation of the set of range bins to provide the set of clutter corrected samples comprises:

averaging samples for the set of range bins across a subset of the plurality of chirps at each antenna to provide, for each range bin at each antenna, an estimated direct current (DC) component of the values, such that a DC component is generated for every possible pair of antenna and range bin; and subtracting, for each of the values in a given range bin for a given antenna, the estimated DC component for that range bin and antenna pair.

17. The method of claim 14, wherein transmitting the plurality of chirps, each comprising a frequency-modulated continuous wave electromagnetic radiation signal, at a region of interest;

receiving electromagnetic radiation reflected from the region of interest after each chirp at the radar sensor module;

mixing the received electromagnetic radiation from each chirp with the transmitted chirp to provide a beat signal; and sampling the beat signal to provide the time series of beat-signal samples for each chirp of the plurality of chirps at each antenna of the plurality of antennas.

18. The method of claim 14, wherein determining the angular spectrum for each range bin comprises applying a covariance-based direction-of-arrival determination algorithm to the clutter corrected samples.

* * * * *